United States Patent [19]

Broughton

[11] 4,447,329

[45] May 8, 1984

[54] CONTINUOUS DESALINATION PROCESS

[75] Inventor: Donald B. Broughton, Des Plaines, Ill.

[73] Assignee: UOP Inc., Des Plaines, Ill.

[21] Appl. No.: 503,490

[22] Filed: Jun. 13, 1983

[51] Int. Cl.³ .......................................... B01D 15/04
[52] U.S. Cl. ..................................... 210/673; 210/677
[58] Field of Search ............... 210/670, 673, 677, 681, 210/686, 687

[56] References Cited

U.S. PATENT DOCUMENTS

| | | | |
|---|---|---|---|
| 2,797,190 | 6/1957 | Scott et al. | 210/677 |
| 2,985,589 | 5/1961 | Broughton et al. | 210/34 |
| 3,131,232 | 4/1964 | Broughton et al. | 210/670 |
| 3,133,016 | 5/1964 | Stine et al. | 210/3 |
| 3,186,940 | 6/1965 | Vajna | 210/677 |
| 3,231,492 | 1/1966 | Stine et al. | 210/24 |
| 3,351,549 | 11/1967 | Bloch | 210/686 |
| 3,425,937 | 2/1969 | Weiss et al. | 210/673 |
| 3,716,481 | 2/1973 | Battaerd | 210/32 |
| 4,039,442 | 8/1977 | Kadlec et al. | 210/32 |
| 4,087,357 | 5/1978 | Barrett et al. | 210/32 |
| 4,157,267 | 6/1979 | Odawara et al. | 127/46.1 |
| 4,184,948 | 1/1980 | Dabby et al. | 210/25 |
| 4,202,737 | 5/1980 | Shimizu | 210/32 |
| 4,206,051 | 6/1980 | Bolto et al. | 210/26 |
| 4,293,423 | 10/1981 | Kosaka et al. | 210/676 |

*Primary Examiner*—Ivars C. Cintins
*Attorney, Agent, or Firm*—James R. Hoatson, Jr.; Louis A. Morris; William H. Page, II

[57] ABSTRACT

A process for the desalination of water in a continuous cyclical adsorptive operation utilizing a thermally regenerable ion retarding resin. The process employs a simulated moving bed scheme having only an adsorption zone, operated at a relatively low temperature, and desorption zone, operated at a relatively high temperature. Effluent is removed from the adsorption zone in two stages for each step of a cycle, a first stage wherein sufficient water is recovered for use as desorbent in the next step, and a second stage wherein the water product stream is withdrawn. Effluent is removed from the desorption zone also in two stages, a first stage wherein a relatively small portion having the composition of the feedstream is withdrawn, and a second stage where the extract stream having a high salt content is withdrawn.

6 Claims, 1 Drawing Figure

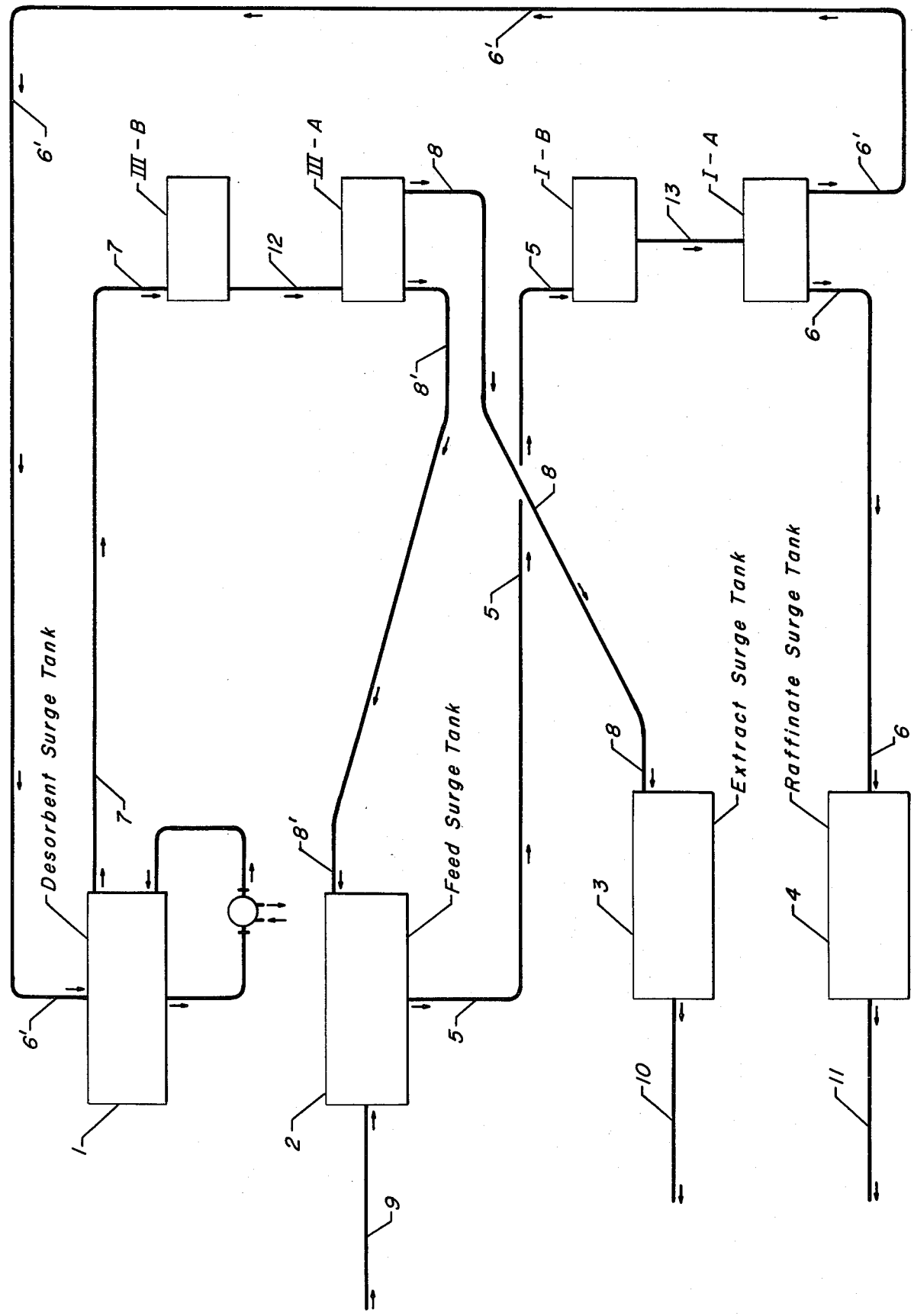

CONTINUOUS DESALINATION PROCESS

BACKGROUND OF THE INVENTION

1. Field of the Invention

This invention relates to the desalination of water by removal of both negative and positive ions of a salt from an aqueous solution. More specifically, the invention relates to a process for separating ions of a salt from aqueous solution by employing an ion exchange resin in a unique simulated moving bed flow scheme.

2. Background Information

It is known in the separation art that certain ion exchange resins, particularly thermally regenerable resins, can be used in separating components from a fluid mixture, particularly salts from an aqueous solution, i.e., the desalination of water. Examples of such art are U.S. Pat. Nos. 4,293,423 to Kosaka et al, 4,206,051 to Bolto et al, 4,202,737 to Shimizu, 4,184,948 to Dabby et al, 4,087,357 to Barrett et al, 4,039,442 to Kadlec et al, 3,716,481 to Battaerd, 3,351,549 to Bloch, 3,231,492 to Stine et al and 3,133,016 to Stine et al. All of the above references teach adsorption of the ions of the salts at relatively low temperature and desorption of the ions or regeneration of the resin at a higher temperature. Some of the above references, i.e., Kosaka et al and Shimizu, disclose continuous processes wherein the resin is physically moved from one location to another for adsorption and desorption to occur. These references show systems where only a single moving bed column is used with various portions of the column comprising specific zones where particular operations such as adsorption, regeneration or buffering occur.

The principal of the simulated countercurrent moving bed to continuously separate, in liquid phase, an extract component from a mixture with a raffinate component by contact with adsorbents selective for the extract component is also known to the art. The basic teaching of the simulated moving bed countercurrent process flow scheme is in Broughton et al U.S. Pat. No. 2,985,589. In the Broughton et al scheme, three and preferably four zones are required in the adsorbent bed including buffer or purification zones whereby liquid which does not exit the column via the raffinate and extract stream outlets continues through the column and serves to flush the downstream (with reference to the direction of liquid flow) adsorbent prior to its simulated movement into the adsorption and desorption zones, respectively. In the above Bloch patent, it is taught that the flow described in Broughton et al may be applied to water desalination.

I have discovered a new simulated countercurrent moving bed flow scheme particularly applicable to the use of a thermally regenerable ion exchange resin and the desalination of water.

SUMMARY OF THE INVENTION

It is, accordingly, the broad objective of this invention to provide a continuous simulated moving bed process for the separation of ions of a salt from an aqueous solution using a thermally regenerable ion exchange resin.

In brief summary, the invention comprises a stepwise cyclical process for the desalination of an aqueous solution of a dissolved salt by employment of an adsorbent comprising a thermally regenerable ion retarding resin. The resin has a retention capacity for the ions of the salt inversely proportional to temperature. The process comprises the following operations: (a) maintaining fluid flow through at least two columns of the adsorbent, at least one column comprising an adsorption zone, and at least one column comprising a desorption zone; (b) maintaining the adsorption zone defined by the adsorbent located between a feed input stream at an upstream boundary of the zone and a raffinate output stream at a downstream boundary of the zone; (c) maintaining the desorption zone immediately upstream, with respect to the single direction, of the adsorption zone, the desorption zone defined by the adsorbent located between a desorbent input stream at an upstream boundary of the zone and the extract output stream at a downstream boundary of the zone; (d) passing the feed mixture into the adsorption zone at adsorption conditions comprising a relatively low temperature to effect the adsorption of the ions of the salt by the adsorbent in the adsorption zone and withdrawing as a raffinate output stream the entire effluent from the adsorption zone comprising water of reduced salt content, a sufficient portion of the raffinate output stream being withdrawn and stored during a first stage of each step for use as the desorbent stream throughout the following step; (e) passing a desorbent material comprising water of reduced salt content into the desorption zone at desorption conditions comprising a relatively high temperature to effect the displacement of the ions from the adsorbent in the desorption zone; (f) withdrawing the entire effluent from the desorption zone sequentially in the course of each step, a quantity of liquid during a first stage having the composition of the feed mixture, such quantity being blended with the feed stream, and, during a second stage, an extract output stream comprising a solution having a higher concentration of salt than the feed mixture; and (g) periodically at the completion of each step advancing through the columns of adsorbent in a downstream direction with respect to fluid flow the feed input stream, raffinate output stream, desorbent input stream, and extract output stream, to effect the shifting of zones through the adsorbent and the initiation of the next step, each cycle being completed upon completion of the number of steps required for a given portion of the adsorbent to make a complete circuit through the zones.

Other objectives and embodiments of the invention encompass details about feed mixtures, flow schemes, and operating conditions, all of which are hereinafter disclosed in the following discussion of each of the facets of the present invention.

BRIEF DESCRIPTION OF THE FIGURE

The Figure represents in schematic form, a preferred embodiment of the simulated moving bed comprising the present invention hereinafter described, including four adsorption columns, I-A, I-B, III-A and III-B.

DESCRIPTION OF THE INVENTION

At the outset the definitions of various terms used throughout the specification will be useful in making clear the operation, objects and advantages of the process.

A "feed mixture" is a mixture containing one or more extract components and one or more raffinate components to be separated by the process. The term "feed stream" indicates a stream of a feed mixture which passes to the adsorbent used in the process.

An "extract component" is a compound or type of compound that is more selectively adsorbed by the adsorbent while a "raffinate component" is a compound or type of compound that is less selectively adsorbed. In this process, ions are the extract components and relatively cool water is the raffinate component. The term "desorbent material" shall mean generally a material capable of desorbing an extract component, in this case relatively hot water. The term "desorbent stream" or "desorbent input stream" indicates the stream through which desorbent material passes to the adsorbent. The term "raffinate stream" or "raffinate output stream" means a stream through which a raffinate component is removed from the adsorbent. The composition of the raffinate stream in this invention will comprise water of reduced salt content. The term "extract stream" or "extract output stream" shall mean a stream through which an extract material which has been desorbed by a desorbent material is removed from the adsorbent. The composition of the extract stream in this invention will comprise an aqueous solution having greater salt concentration than the feed solution. Although it is possible by the process of this invention to produce a high purity raffinate product (water) at high recoveries, it will be appreciated that an extract component is never completely adsorbed by the adsorbent and usually trace amounts of salt at acceptable concentrations will appear in the water product. The extract and raffinate streams then are further distinguished from each other and from the feed mixture by the ratio of the concentrations of an extract component and a raffinate component appearing in the particular stream. More specifically, the concentration of ions will be lowest in the raffinate stream, next highest in the feed mixture, and the highest in the extract stream.

The term "selective pore volume" of the adsorbent is defined as the volume of the adsorbent which selectively adsorbs an extract component from the feed mixture. The term "nonselective void volume," or just "void volume," of the adsorbent is the volume of the adsorbent which does not selectively retain an extract component from the feed mixture. This volume includes the cavities of the adsorbent which contain no adsorptive sites and the interstitial void spaces between adsorbent particles. The selective pore volume and the void volume are generally expressed in volumetric quantities and are of importance in determining the proper flow rates of fluid required to be passed into an operational zone for efficient operations to take place for a given quantity of adsorbent. When adsorbent "passes" into an operational zone (hereinafter defined and described) employed in this process its void volume together with its selective pore volume carries fluid into that zone.

The principal application of the present process is for the recovery of water from an aqueous salt solution. The feedstock solution utilized for such water recovery is preferably a solution of minimum salt content, since the capacity of the ion retention agent and its efficiency in the desalination process is inversely proportional to the concentration of the salt in the feedstock solution, the yield of water per unit of feedstock increasing in inverse proportion to the salt content of the feedstock. This adaptation of the process provides a means for producing potable water at a stage in the growth of world population when the present sources of water are rapidly becoming inadequate and when new sources of supply are being actively sought throughout much of the world, not only for purposes of direct human and animal consumption to sustain life and maintain sanitary standards, but also for the irrigation of plant life and for the vast number of other uses requiring potable water. Although sea water is readily available in virtually unlimited quantities and may be pumped inland for substantial distances to available heating facilities and to sources of electric power and other forms of energy, the recovery of potable water from sea water by conventional methods presents a formidable problem of cost because the separation of water from its saline solutions using such facilities as distillation, freezing, membrane dialysis, ion exchange, etc., involves the consumption of large quantities of heating, cooling, and electrical utilities or requires such large outlays of capital for equipment that the per unit cost of potable water (containing not more than 500 ppm of solids) produced by such means from sea water generally exceeds the upper limit of acceptable cost. Except for special uses of potable water which would justify a cost exceeding such limits, the foregoing conventional procedures have been generally discredited as reasonably feasible means for the production of potable water on a large scale.

On the other hand, in the aforementioned Bloch prior art patent, which adopts the former Broughton et al simulated moving bed flow scheme, there are, notwithstanding the merits, advance in the art and utility of the Bloch invention, inherent inefficiencies and complexities which the present invention avoids. The differences between the present invention and invention of Bloch will be discussed in greater detail hereinbelow.

The desalination of aqueous salt solutions in accordance with the process of this invention is dependent upon the effectiveness of a water-immiscible composition referred to herein as an ion retention agent which is capable of forming an addition-type complex with the salt component of the feedstock solution. By contacting the feedstock solution with such a composition, the salt ions in solution are retained in a separately recoverable phase, in effect extracting the latter from the feedstock solution and leaving as the other phase, water of greatly reduced salt content. The process, accordingly, is dependent upon the capacity of the ion retention agent for retaining the salt ions in an absorbed state at the lowermost or datum temperature provided by the process. The feasibility of the present desalination process as an economically justifiable means for producing a product of low cost is also dependent upon the ability of the composition to release its absorbed salt ions extracted from the aqueous feedstock solution, without the expenditure of large inputs of energy, or by other costly procedures for restoring the ion retention agent to its activated or regenerated state. In the process of the present invention, an integral phase of the overall process is the release of the salt ions from the "spent" ion retention agent at conditions which disrupt ionic equilibrium between the ions present in the surrounding fluid phase and the ions already present in an absorbed state on the ion retention agent, whereby the ions present in the ion retention agent migrate from the resin to the surrounding fluid phase. Such disruption of ionic equilibrium is effected either by increasing the temperature of the surrounding fluid phase (the aqueous desorbent) to a level more elevated with respect to the initial "datum" temperature, by reducing the salt content of the surrounding fluid phase below the salt concentration of the initial feedstock solution supplied to the process, or by combining both of the aforementioned means in a unitary regeneration procedure to promote the rate or the degree of salt removal from the ion retention agent by the mutually additive effect of both temperature and the disruption of ionic equilibrium. Heated raffinate product, which is comparatively pure water, is thus an ideal desorbent material.

The foregoing heat-reversible ion retaining properties of the present ion retenetion agents enable the salt ions to be desorbed from the spent composition during the regeneration stage to thereby supply a regenerated resin for repeated use of the same composition in a cyclic flow arrangement for further removal of ions from the feed stock solution at a more downstream portion of the cycle.

The ion retention agents utilized herein to remove dissolved salts from aqueous feed stock solutions are members of a group of materials which in general are capable of forming a reversible complex with both the electronegative and the electropositive ions of the salt component of the solution. The designation of these compositions, which in some instances are solids and in other instances are liquids, as ion retention agents is thus an indication of their function in the present process, the agent in each case acting essentially as a means for withdrawing the salt ions from the solution and retaining the salt in the form of an addition complex with the composition in a sufficiently tenacious combination and for a sufficient length of time to permit the withdrawal of salt-depleted water from the downstream outlet of the ion retention or adsorption zone. The adsorption zone of the process cycle must therefore contain sufficient ion retention capacity in the form of the water immiscible ion retention agent to remove a substantial amount of the salt ions from the feed stock solution at the feed stock flow rate and at the temperature and salt concentration at which the feed stock is supplied to the process.

The composition employed herein as the ion retention agent must also have the aforementioned property of reversibly releasing the salt from its addition complex with the composition as the temperature of the surrounding aqueous phase is increased beyond the ionic equilibrium temperature for the aqueous phase in contact with the "spent" composition. These properties characterize generally certain macromolecular weight solid or liquid resinous or resin-like materials which qualify as thermally regenerable ion retention agents in the present process.

Examples of ideal thermally regenerable resins for use in the present invention are the "heterogeneous thermally regenerable resins" as enumerated in aforementioned U.S. Pat. No. 4,293,423 to Kosaka et al, incorporated herein by reference.

With reference to the Figure for a more detailed explanation of the present invention, an adsorption zone is shown as comprising columns I-A and I-B, and a desorption zone as comprising columns III-A and III-B. Roman numerals I and III were chosen to designate the adsorption and desorption zones, respectively, because those numerals are commonly used to indicate the corresponding zones in the prior art (Broughton et al) simulated moving bed flow scheme. A comparison between the processes of the prior art and the present invention is facilitated by using similar nomenclature where possible.

The embodiment of the present invention shown in the Figure is the most preferred embodiment wherein each zone comprises two columns and wherein four surge tanks 1, 2, 3 and 4 are employed.

The adsorption zone, zone I, is defined as the adsorbent located between the feed inlet stream 5 at an upstream boundary and the raffinate outlet stream 6 or 6' at a downstream boundary. In this zone, the feedstock contacts the adsorbent, an extract component is adsorbed, and a raffinate stream is withdrawn. Since the general flow through zone I is from the feed stream which passes into the zone to the raffinate stream which passes out of the zone, the flow in this zone is considered to be a downstream direction when proceeding from the feed inlet to the raffinate outlet streams.

Upstream of zone I with respect to the fluid flowing in zone I is the desorption zone or zone III. The desorption zone is defined as the adsorbent between the desorbent inlet 7 at an upstream boundary and the extract outlet stream 8 or 8' at a downstream boundary. The function of the desorption zone is to allow a desorbent material which passes into this zone to displace the extract component which was adsorbed upon the adsorbent during a previous contact with feed in zone I in a prior step of the operation. The flow of fluid in zone III is essentially in the same direction as that of zone I.

A cyclic advancement of the input and output streams through the fixed beds of adsorbent can be accomplished by utilizing a manifold system in which the valves in the manifold are operated in a sequential manner to effect the shifting of the input and output streams thereby allowing a flow of fluid with respect to solid adsorbent in a countercurrent manner. Another mode of operation which can effect the countercurrent flow of solid adsorbent with respect to fluid involves the us of a rotating disc valve in which the input and output streams are connected to the valve and the lines through which feed input, extract output, desorbent input, and raffinate output streams pass are advanced in the same direction through the adsorbent beds. Both the manifold arrangement and disc valve are known in the art. Specifically, rotary disc valves which can be utilized in this operation, after modification to allow for the flow scheme of this invention, can be found in U.S. Pat. Nos. 3,040,777 and 3,422,848. Both of the aforementioned patents, incorporated herein by reference, disclose a rotary type connection valve in which the suitable advancement of the various input and output streams from fixed sources can be achieved without difficulty. A specific valve position will correspond to specific locations of the liquid access points on the chambers.

The time between each shift or advance is referred to as a "valve time." In the present invention one step occurs during each valve time. The time it takes for the cyclic advancement to proceed from a specific point in the column back to that point is referred to as a "cycle time." A "cycle" is completed upon the passing of each cycle time or upon each complete advancement through all of the adsorbent beds. In the embodiment shown there are four steps per cycle because there are four beds and each step involves advancement by one bed.

One immediately apparent difference between the flow scheme of the present invention and that of the Broughton et al patent is the lack in the former of the purification and buffer zones II and IV, of the latter, particularly zone II which is essential to the latter. In Broughton et al, zone II lies between zones I and III and the operations that take place therein are the displacement from the nonselective void volume of the adsorbent of any raffinate material carried into zone II, by the shifting of adsorbent into this zone, and the desorption of any raffinate material adsorbed within the selective pore volume of the adsorbent or adsorbed on the surfaces of the adsorbent particles. Purification is achieved by a portion of extract stream material which flows from zone III into zone II to effect the displacement of raffinate material. The flow of material in zone II is in a downstream direction from the extract outlet stream to the feed inlet stream.

Buffer zone IV in Broughton et al, if used, is located immediately upstream with respect to the fluid flow to zone III. Zone IV would be utilized to conserve the amount of desorbent utilized in the desorption step since a portion of the raffinate stream which is removed from zone I can be passed into zone IV to displace desorbent material present in that zone out of that zone into the desorption zone. Zone IV will contain enough adsorbent so that raffinate material present in the raffinate stream passing out of zone I and into zone IV can be prevented from passing into zone III thereby contaminating extract stream removed from zone III. In the instances in which the fourth operational zone is not utilized, the raffinate stream passed from zone I to zone III must be carefully monitored in order that the flow directly from zone I to zone III can be stopped when there is an appreciable quantity of raffinate material present in the raffinate stream passing from zone I into zone III so that the extract outlet stream is not contaminated. The flow of fluid in zone IV is essentially in the same direction as that of zones I, II and III.

In the present invention there is no need for zones II and IV partly because zones I and III are not directly interconnected, i.e., there can be no liquid flow directly from zone III to zone I or from zone I into zone III, with resultant contamination of the respective zones, e.g., high salt content extract product stream flowing into zone I from zone III. In marked contradistinction to former Broughton et al, the entire zone III effluent is removed from the adsorbent beds.

The question now arises as to what is done with the liquid in the void volume of bed III-A immediately following a step change, since this liquid has feed stream composition in view of bed III-A having been bed I-B, into which the feed stream is injected via line 5, immediately prior to the step change. The answer lies in a twostage procedure comprising part of the operations of the present invention wherein, in the first stage, a void volume of liquid having feedstock composition is removed via line 8' for blending with feedstock and, in a second stage, for the remainder of the step, liquid comprising extract product is removed via line 8. The use of feed surge tank 2 is particularly preferred since it allows an accumulation of feedstock due to the increased flow via line 8' without need for continuously adjusting the feed flow rate to the process flowing into the process via line 9. Feed surge tank 2 would, of course, be the sole source of feed for flow into column I-B via line 5. Extract surge tank 3 would be convenient for permitting the extract product stream to be removed from the process at a steady continuous rate notwithstanding the discontinuous flow of extract product via line 8.

Also, in the course of a step change, what was column or bed III-B becomes column or bed I-A. Unlike the above considerations concerning beds III-A and I-B, however, this presents no problem as far as void volume composition is concerned since the desorbent stream composition (pure water) passing into III-B via line 7 is intended to have the same composition as the raffinate product exiting I-A via line 6. Nevertheless, there are also two stages for each step with regard to withdrawal of effluent from IA not necessarily and probably not of the same duration of the stages relating to III-A. In the first stage, sufficient raffinate (water) is withdrawn via line 6' to serve as desorbent during the entire following step, and surge tank 1 may be employed to accumulate the desorbent for such subsequent use. The effluent withdrawn from I-A during the remainder or second stage of each step is the raffinate product stream which, as a matter of convenience, may be accumulated in raffinate surge tank 4.

An essential aspect of the present invention is the maintenance of markedly different temperatures between zones I and III so as to achieve adsorption and desorption which are temperature dependent. Zone I must have a relatively cool temperature, preferably from about 10° C. to about 30° C. Zone III requires a relatively high temperature, preferably from about 90° C. to about 100° C. The flow scheme of the present invention, which enables complete isolation of the zones is uniquely conducive to such separate temperature maintenance.

Further explanation of the present invention is best accomplished by reference to the following nonlimiting illustrative embodiment which, although not obtained from actual data, is deemed to be an accurate representation of the expected performance of the present invention.

ILLUSTRATIVE EMBODIMENT

With reference to the attached figure, the following table summarizes the flow rates, cumulative flow over a given step, period of time flow occurs during a given step, salt concentration and temperature for each numbered stream in the process. The four columns are presumed to be packed with a thermally regenerable ion exchange resin. The cycle time is 30 minutes with 7.5 minutes for each step.

TABLE

| Stream No. | Flow Rate | Cumulative Flow | Time of Flow | Concentration | Temperature |
|---|---|---|---|---|---|
| 5 | 142.8 cfm | 1071 ft$^3$ | 0–7.5 min | 2000 wt. ppm | 27° C. |
| 6 | 142.8 | 696 | 2.626–7.5 | 450 | 27° C. |
| 6' | 142.8 | 375 | 0–2.626 | 450 | 29° C. |
| 7 | 50.0 | 375 | 0–7.5 | 450 | 95° C. |
| 8 | 50.0 | 355 | 0.4–7.5 | 5000 | 95° C. |
| 8' | 50.0 | 20 | 0–0.4 | 2000 | 27° C. |
| 9 | 140.13 | 1051 | 0–7.5 | 2000 | 27° C. |
| 10 | 47.33 | 355 | 0–7.5 | 5000 | 95° C. |
| 11 | 92.8 | 696 | 0–7.5 | 450 | 27° C. |

There are several items of particular interest with regard to the table. It should first be recalled that in changing from the step previous to the step of the table, there is a simulated movement upstream with respect to the direction of fluid flow of one column Thus, for example, what was bed I-B has become bed III-A. Therefore, it is desirable to remove in a first stage one void volume of liquid (illustrated as 20 ft$^3$ in the first 0.4 min of the step) from III-A via line 8' to be blended with feed prior to removal of an extract product stream via line 8 because that void volume of liquid has the composition and temperature of the feed passed into I-B prior to the step. In operation, the switch from line 8' to line 8 could be controlled by a timer set in accordance with the flow rate through line 8' and the measured void volume of III-A.

It should also be noted that the volume of liquid first removed from I-A (375 ft³ in 2.626 min) via line 6' is sufficient to provide enough desorbent for use via line 7 throughout the following step (375 ft³ in 7.5 min). The switch from line 6' to line 6 could also be accomplished by use of a timer.

Also, the liquid removed via line 6', which in effect has the weighted average temperature of the liquid over the period of withdrawal, is slightly higher than the temperature of the liquid removed over the remainder of the step via line 6. The reason is that the temperature of the entire bed I-A, including the void volume of liquid within it, at the initiation of the step in question is the relatively high temperature of bed III-B from which I-A is derived in the course of the simulated movement of beds. The void volume of bed I-A, however, is small (20 ft³) compared to the volume eluted from it (375 ft³) in the first adsorption zone stage of the step, and the sensible heat of the solid material, i.e. resin, in bed I-A is minor compared to that of such volume of liquid, both factors accounting for the little average difference in temperature of the liquid flowing in line 6' to desorbent surge tank 1 and the temperature of liquid later flowing in line 6.

With further regard to temperature considerations, zone I is maintained at the relatively low temperature of the feed stream passing through it which, of course, is exactly as is required by the invention. The required high temperature of zone III, however, must be provided by high temperature desorbent liquid originating in bed I-A, which, as discussed above, is only very slightly warmer than the temperature of zone I. Desorbent, therefore, must be heated prior to passing into zone III. A convenient mean of providing such heat would be a heat source located in or associated with desorbent surge tank 1 as shown, including an automatic set point temperature controller.

A last point concerns the further usefulness of surge tanks 2, 3 and 4. The above data indicates constant flow rates of liquids provided to and recovered from the process during the entire course of each step in spite of the varying duration of flow of the streams internal to the process. Such constancy is, of course, highly desirable.

I claim as my invention:

1. A stepwise cyclical process for the desalination of an aqueous solution of a dissolved salt by employment of an adsorbent comprising a thermally regenerable ion retarding resin which has a retention capacity for the ions of said salt inversely proportional to temperature, which process comprises the following operations:
   (a) maintaining fluid flow through at least two columns of said adsorbent, at least one column comprising an adsorption zone, and at least one column comprising a desorption zone;
   (b) maintaining said adsorption zone defined by the adsorbent located between a feed input stream at an upstream boundary of said zone and a raffinate output stream at a downstream boundary of said zone;
   (c) maintaining said desorption zone immediately upstream, with respect to said single direction, of said adsorption zone, said desorption zone defined by the adsorbent located between a desorbent input stream at an upstream boundary of said zone and said extract output stream at a downstream boundary of said zone;
   (d) passing said feed mixture into said adsorption zone at adsorption conditions comprising a relatively low temperature to effect the adsorption of the ions of said salt by said adsorbent in said adsorption zone and withdrawing as a raffinate output stream the entire effluent from said adsorption zone comprising water of reduced salt content, a sufficient portion of said raffinate output stream being withdrawn and stored during a first stage of each step for use as the desorbent stream throughout the following step;
   (e) passing a desorbent material comprising water of reduced salt content into said desorption zone at desorption conditions comprising a relatively high temperature to effect the displacement of said ions from the adsorbent in said desorption zone;
   (f) withdrawing the entire effluent from said desorption zone sequentially in the course of each step, a quantity of liquid during a first stage having the composition of said feed mixture, such quantity being blended with the feedstream, and, during a second stage, an extract output stream comprising a solution having a higher concentration of salt than said feed mixture; and
   (g) periodically at the completion of each step advancing through said columns of adsorbent in a downstream direction with respect to fluid flow the feed input stream, raffinate output stream, desorbent input stream, and extract output stream, to effect the shifting of zones through said adsorbent and the initiation of the next step, each cycle being completed upon completion of the number of steps required for a given portion of said adsorbent to make a complete circuit through said zones.

2. The process of claim 1 wherein said adsorption zone and said desorption zone each comprise two columns, the columns in each zone being serially interconnected, each periodic advancement following each step comprising a shift upstream of one column for each zone, and each cycle comprising four steps.

3. The process of claim 1 wherein said quantity of liquid withdrawn from said desorption zone in said first stage of each step as in operation (f) is approximately equal to the void volume of the adsorbent which became part of the desorption zone pursuant to the periodic advancement immediately preceding said step.

4. The process of claim 1 wherein said relatively low temperature of operation (d) comprises from about 10° C. to about 30° C. and said relatively high temperature of operation (e) comprises from about 90° C. to about 100° C.

5. The process of claim 1 wherein four surge tanks are used in conjunction with said process, (1) a desorbent surge tank which is filled with said raffinate output stream of operation (d) during said first stage of each step as in operation (d) and which comprises the sole source of desorbent; (2) a feed surge tank which is filled partially by said quantity of liquid withdrawn from said desorption zone in the first stage of each step as in operation (f) and the remainder by the feed input stream to said process which may be maintained at a constant flow rate, the feed surge tank comprising the source of feed to said adsorption zone; (3) an extract surge tank which is filled with said extract output stream of said second stage of operation (f), the effluent of said extract surge tank comprising the process extract output stream which may be maintained at a constant flow rate; and (4) a raffinate surge tank which is filled with said raffinate output stream of operation (d) during the part of each step following said first stage, the effluent of said raffinate surge tank comprising the process raffinate output stream which may be maintained at a constant flow rate.

6. The process of claim 5 wherein said desorbent material in operation (e) is heated to said relatively high temperature by heat addition and temperature control means associated with said desorbent surge tank.

* * * * *